June 30, 1953   E. NATHAN   2,643,903
KNOB AND SHAFT CONNECTION
Filed May 18, 1949
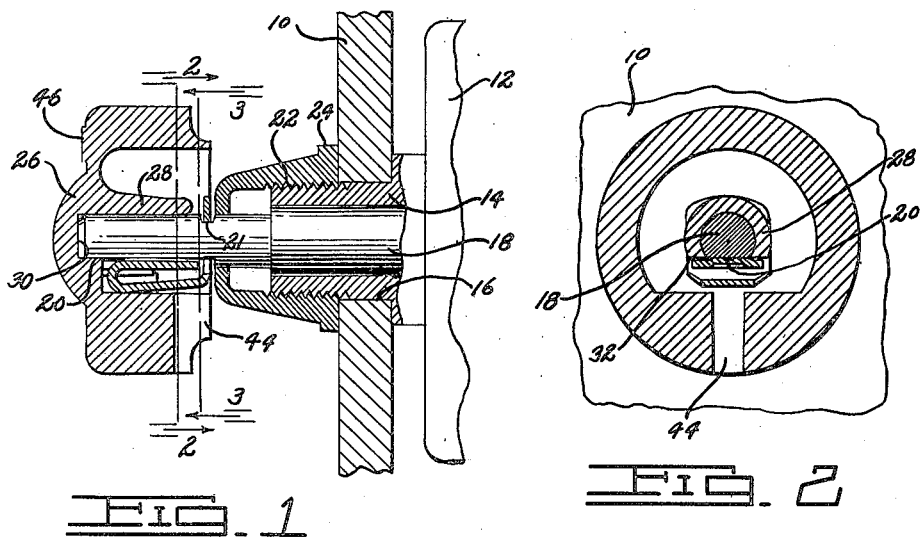
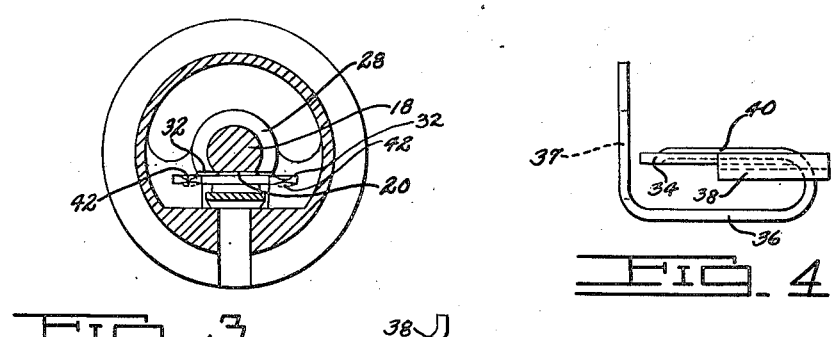
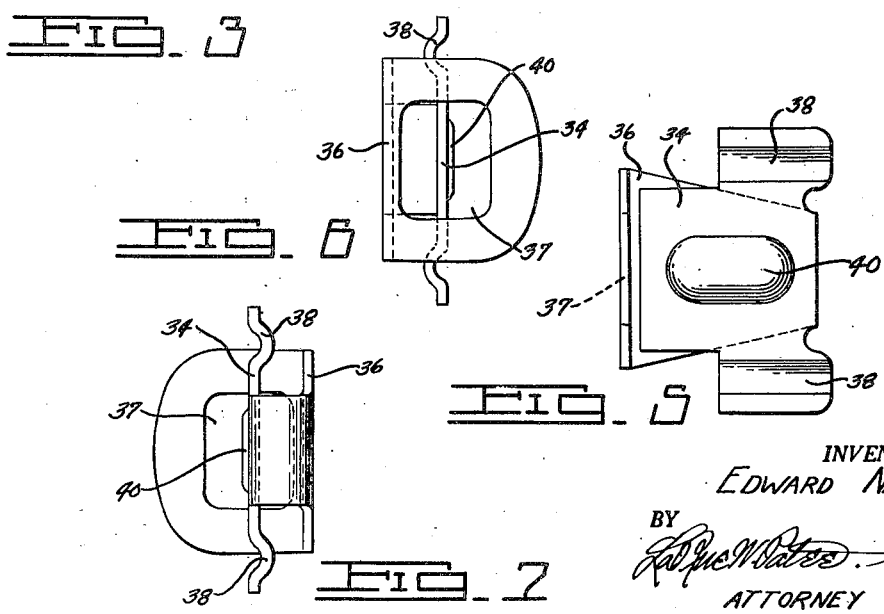
INVENTOR.
EDWARD NATHAN
BY
ATTORNEY

Patented June 30, 1953

2,643,903

UNITED STATES PATENT OFFICE 2,643,903

KNOB AND SHAFT CONNECTION

Edward Nathan, New York, N. Y., assignor to
Lectra Products Co., New York, N. Y.

Application May 18, 1949, Serial No. 94,014

2 Claims. (Cl. 287—53)

This invention relates to a control means, such as a knob assembly, for regulating instruments mounted on a panel or the like and more particularly to improvements in a knob and its associated means for final assembly on an instrument after the instrument has been mounted as set forth in my co-pending application Serial Number 74,421 filed February 3, 1949.

In the mounting of instrument controls on the dash of an automobile, it is desirable to first assemble the instruments permanently on the panel in a predetermined position, after which the knob or control means for the instrument is applied thereto in a definite position relative to the instrument and the panel.

Panel switches and control instruments are in wide use and generally include a threaded sleeve adapted to be inserted through the panel and held in place by a threaded nut. Indicia means are usually provided on the panel, the front face of the instrument, or the nut for indicating various positions of the instrument setting. This requires a predetermined location between the instrument and the panel or between the instrument and the position of the nut. The knob is sometimes provided with an indicator for showing the location of the angular position of the knob relative to the panel or instrument.

The present invention provides a knob construction which is readily assembled on an instrument permanently fixed on the panel and one which may be removed when it is desired to disassemble the instrument and at the same time maintaining a definite relation between the indicating means on the respective parts.

It is an object of the present invention to provide a retainer between the knob proper and the instrument shaft which secures the knob on the shaft by tension means.

Another object of the invention is to provide a knob having a retainer which is applied to the instrument by "snap on" means and necessitates the manipulation of the "snap on" means to remove the knob from the instrument.

Other objects and advantages of the invention will more fully appear from the following description taken in connection with the accompanying drawings in which:

Fig. 1 is a cross sectional view showing a panel, a knob, and securing means for an instrument to the panel;

Fig. 2 is a sectional view taken on line 2—2 of Fig. 1;

Fig. 3 is a sectional view taken on line 3—3 of Fig. 1;

Figs. 4 and 5 are side and plan elevational views respectively of the retaining means for the knob on the instrument shaft;

Figs. 6 and 7 are end elevational views showing opposite ends of the retaining means for the knob on the instrument shaft.

Referring to the drawings, I have shown the invention as applied to control members for an instrument applied to the instrument panel of an automobile. However, it may be applied to other forms of controls and mountings.

Instrument controls such as switches, mixture regulators, or position indicators are usually provided with indicia for indicating the position of the control setting and it is desirable to mount the control in a predetermined position with respect to the instrument control means so that it always appears in the same location regardless of the position of the securing means for the instrument. This is also true of indicating means on the knob whether it co-operates with the instrument securing means or the instrument in designating the switch position.

In carrying out the invention I have shown an instrument panel 10, having a switch 12 positioned on the rear face of the panel 10. The switch 12 is provided with an externally threaded sleeve 14 which fits through an opening 16 in the instrument panel 10.

The switch 12 is shown provided with a control shaft 18 projecting forwardly through the sleeve 14 for manipulating the switch 12. The shaft 18 is shown as an annular rod having a flat side portion 20 and a transverse channel 21 diametrically opposite the flat side portion 20 which locate the knob when applied. If indicia is applied to the switch, the panel or the nut securing means, it is important to accurately position the indicia with respect to the flat side portion 20.

In the form of the invention shown, the switch 12 is applied to the back side of the panel 10 with the threaded sleeve projecting through the panel, a retaining nut 22 is threaded on the sleeve 14 and drawn up tightly against the front face of the panel 10 to hold the switch 12 in position. A portion 24 of the periphery of the nut 22 is angularly shaped, as a hex, for the reception of a tool used in turning the nut 22 on the sleeve 14.

A knob 26 is provided with a boss 28 having an opening 30 corresponding in shape to the end of the shaft 18 for receiving the latter. A transverse slot 32 is formed in the boss, intersecting the opening 30. A spring steel retainer, shown in Figs. 4, 5, 6 and 7, is adapted to be received in the slot 32.

The retainer comprises a body portion 34 in a substantially flat plane and a reversely bent portion 36 which extends beyond the end of the body portion 34 and is bent upwardly toward the body portion 34. The upwardly bent portion is provided with an aperture 37. The opposite edges of the body portion 34 have raised portions 38 and the central portion of the body 34 has a raised portion 40.

The raised portions 38 extend the length of the body portion 34 imparting resiliency thereto. The retainer is inserted in the slot 32 with the looped end toward the closed end of the knob, as shown in Fig. 1. The raised portions 38 of the body portion 34 project a greater distance than the width of the slot 32 therefore the raised portions 38 frictionally engage the sides of the slot 32 to retain the member in assembled position and the raised portion 40 frictionally and resiliently bears against the flat portion 20 of the shaft 18. Since the retainer is held against turning in the knob and the retainer bears against the flat of the shaft, the knob is positively held on the shaft and against relative turning therewith. The retainer is further held in assembled position by peening the edges of the slot 32 over the outer ends of the side portions of the retainer, as shown at 42.

When the knob and its retainer are assembled, the shaft 18 is inserted in the opening 37 of the resilient arm 36 so that the edge of the opening 37 snaps into the channel 21 of the shaft 18, as shown in Fig. 1, thereby retaining the knob against longitudinal displacement. When it is desired to remove the knob from the shaft, a tool is inserted through an opening 44 in the knob, and the arm 36 is pressed inwardly releasing it from engagement with the channel 21. The knob can be readily slid off the shaft.

An indicating projection 46 is shown on the front face of the knob for indicating the angular position of the knob relative to indicia on the nut, dash or instrument. The opening 30 in the knob extends beyond the slot opening and one portion of the opening has a flat face corresponding to the shape of the shaft 18 so that the knob is further held against relative rotation.

It will be understood that various changes including the size, shape, and arrangement of parts, may be made without departing from the spirit of my invention and it is not my intention to limit its scope other than by the terms of the appended claims.

I claim:
1. In a connection, a part including a slot and an axial recess provided with a flat side wall, a co-operating part comprising a shaft having a recess therein and a flat side face adapted to abut the flat side wall of said axial recess, and a fastener comprising a body portion in a substantially flat plane, a reversely bent portion extending beyond said body portion and bent at right angles to the plane of said body portion, the last named portion provided with an aperture, said fastener secured within said slot permitting a surface of said body portion to frictionally engage the flat side face of said shaft, and an edge of the aperture of said fastener adapted for engaging in the recess of said shaft.

2. In a connection, a part including an axial recess provided with a flat side wall and having lateral recesses substantially in a horizontal plane with the side wall, a co-operating part comprising a shaft having a recess therein and a flat side face disposed on the opposite side of the shaft to the recess, a fastener comprising a body portion in a substantially flat plane, a reversely bent portion extending beyond said body portion and a portion of which is bent at right angles to the plane of said body portion, the bent portion at right angles being provided with an aperture, and laterally extending edge portions carried by the body portion received in the lateral recesses for locking engagement with the part having the axial recess, the contacting area of the flat body portion of the fastener with respect to the flat side face of the co-operating part being raised out of the plane of the flat body portion and resiliently deflectable when the parts are assembled by deflection of the laterally extending edge portions of said body portion.

EDWARD NATHAN.

References Cited in the file of this patent
UNITED STATES PATENTS

| Number | Name | Date |
|---|---|---|
| 798,271 | Donalds | Aug. 29, 1905 |
| 1,954,062 | Walter | Apr. 10, 1934 |
| 2,030,700 | Hoxie | Feb. 11, 1936 |
| 2,172,977 | Kimball | Sept. 12, 1939 |
| 2,179,383 | Rodwick | Nov. 7, 1939 |
| 2,225,594 | Murphy | Dec. 17, 1940 |
| 2,242,591 | Murphy | May 20, 1941 |
| 2,487,490 | Sterrett | Nov. 8, 1949 |